United States Patent [19]

Ekchian et al.

[11] Patent Number: 4,673,932
[45] Date of Patent: Jun. 16, 1987

[54] RAPID INVENTORY DATA ACQUISTION SYSTEM

[75] Inventors: Jack A. Ekchian, Watertown; Robert W. Hoffman, Arlington, both of Mass.; Leon Ekchian, Woodland Hills, Calif.; Kaigham J. Gabriel, Belmont, Mass.

[73] Assignee: Revlon, Inc., New York, N.Y.

[21] Appl. No.: 566,534

[22] Filed: Dec. 29, 1983

[51] Int. Cl.[4] .............................................. H04Q 9/12
[52] U.S. Cl. ......................... 340/825.54; 340/825.35; 235/385
[58] Field of Search .................... 340/825.54, 825.35, 340/505, 572; 235/385; 364/403; 343/895; 324/77 E, 77 A, 77 Q

[56] References Cited

U.S. PATENT DOCUMENTS

| | | | |
|---|---|---|---|
| 3,246,245 | 4/1966 | Turner | 325/442 |
| 3,671,721 | 6/1972 | Hunn et al. | 340/825.35 |
| 3,707,711 | 12/1972 | Cole et al. | 340/825.54 |
| 3,714,566 | 1/1973 | Kang | 324/77 E |
| 3,731,273 | 5/1973 | Hunt | 340/16 |
| 3,752,960 | 8/1973 | Walton | 235/61 |
| 3,780,368 | 12/1973 | Northeved et al. | 340/572 |
| 3,816,708 | 6/1974 | Walton | 235/61 |
| 3,842,246 | 10/1974 | Kohler et al. | 235/61 |
| 4,021,705 | 5/1977 | Lichtblau | 340/572 |
| 4,087,821 | 5/1978 | Phelan | 343/895 |
| 4,160,971 | 7/1979 | Jones et al. | 340/152 T |
| 4,308,530 | 12/1981 | Kip et al. | 340/572 |
| 4,319,248 | 3/1982 | Flam | 343/895 |
| 4,364,043 | 12/1982 | Cole et al. | 340/825.54 |
| 4,369,557 | 1/1983 | Vandebult | 340/572 |
| 4,387,379 | 6/1983 | Hardie | 343/895 |
| 4,471,345 | 9/1984 | Barrett, Jr. | 340/505 |
| 4,498,076 | 2/1985 | Lichtblau | 340/572 |
| 4,525,713 | 6/1985 | Barletta et al. | 340/825.54 |

Primary Examiner—Donald J. Yusko
Attorney, Agent, or Firm—Kenway & Jenney

[57] ABSTRACT

A computerized transceiver repeatedly sweeps through a set of transmit/receive frequencies to interrogate collectively a plurality of groups of items in a stocking area. Items in each group are tagged with a printed circuit transponder tuned to frequencies uniquely assigned to each group. Data turned is stored and combined mathematically by the computer to arrive at the total number of items in each group. The system is particularly adapted for taking inventory of a large number of retail shelf goods using a mobile transceiver.

18 Claims, 13 Drawing Figures

PHASE LOCKED TRANSCEIVER

RAPID INVENTORY DATA ACQUISTION SYSTEM

BACKGROUND OF THE INVENTION

The present invention relates generally to inventory control and more particularly to automatic shelf inventory data systems.

The availability of inventory technology coupled with the sales downturn and increased operating costs of recent recessionary periods have combined to force retailers to meet competitors' aggressive pricing by using more stringent inventory control techniques. The hidden costs associated with excess inventory or overstocking in the competitive retail industry are critically important. Large retailers estimate that the true cost of carrying inventory is on the order of 40% of the cost of the item per year. Moreover, the more inventory, the more manpower is required for inventory control. Most importantly to the retail food and drug trade, however, overstocking results in inflexible pricing. In many stores, electronic cash registers at the checkout counters have been replaced by computerized point of sale terminals. Optical scanners and bar codes on products, while posing other problems, allow flexible pricing and computerized real time inventory control and automated stock ordering. All in all, the various types of material requirement planning systems available today throughout the retail, wholesale and manufacturing sectors have become a indispensable tool of cost control.

Establishing precise control over retail inventory, however, requires more than reading bar codes at the checkout counter. In order to be purchased, products have to not only be ordered but delivered, uncrated, unboxed, marked and moved from the stock room onto the shelves or peg racks in the retail store. Even overstocked items will fail to reach the checkout counter unless they are on the shelf.

Taking inventory for reordering or restocking of shelves is time consuming but essential, particularly where individual stores such as discount drug stores, stock thousands of shelf items. Shelf stock-taking should be fast and inexpensive to encourage daily adjustments. However, today shelf inventory taken by visual inspection often requires manipulation of individual products hung eight deep on a peg rack. Bar codes are of little use on the shelf since they are usually hidden from view and in any event must be individually scanned. Ironically, the optical techniques which are so efficient at the checkout counter are ill adapted for inventorying shelf goods.

SUMMARY OF THE INVENTION

Accordingly, the general purpose of the invention is to automatically inventory shelf goods without individual scanning or manipulation.

A corollary object of the invention is to produce an inventory of individual products by stock keeping unit (SKU) by collectively, remotely and automatically ascertaining the quantity of products for a series of SKU's comingled on a given shopping aisle.

These and other objects of the invention are achieved by tagging each product with a tiny passive resonant transponder, preferably in the form of a printed circuit small enough to be attached unobtrusively to a lipstick, and employing a computerized transceiver, preferably mounted on a wheeled cart, to repeatedly sweep through a set of transmit/receive frequencies to interrogate collectively all the products belonging to specific SKU's arranged on a peg rack, for example. The data returned during interrogation at each SKU-specific frequency set is stored and combined mathematically by the computer to arrive at the total number of products in each of the interrogated SKU's for a given stocking area in a drug store or supermarket, for example.

In the preferred embodiment, the mobile transceiver transmits at a pair of frequencies specific to a given SKU. Products of that SKU are equipped with tags which resonate at the unique pair of frequencies and reradiate simultaneously a third frequency to which the receiver portion of the transceiver is tuned. The amplitude of the third frequency detected by the receiver is a function of distance, receiver antenna pattern and the number of tag products present on the shelf or peg rack of the particular SKU. As the transceiver moves down the aisle, the transceiver, preferably under software control, sweeps through the plurality of SKU specific transmit/receive frequency sets.

In the preferred embodiment, the frequencies are derived from a master crystal oscillator and tuned in phase-locked loop frequency synthesizing circuits so that they will track precisely the nominal SKU frequency sets.

The preferred form of the tag itself is a circular printed circuit having three sets of two interleaved, coaxial, spiral conductive arms providing three tuned circuits. Each pair of arms can be cut to length corresponding to a frequency. The arm pairs are nonlinearly, mutually capacitively and inductively coupled so that upon excitation at transmit frequencies, the tag emits a third frequency which is a function (preferably the sum) of the first two frequencies.

DETAILED DESCRIPTION

Figure 1:
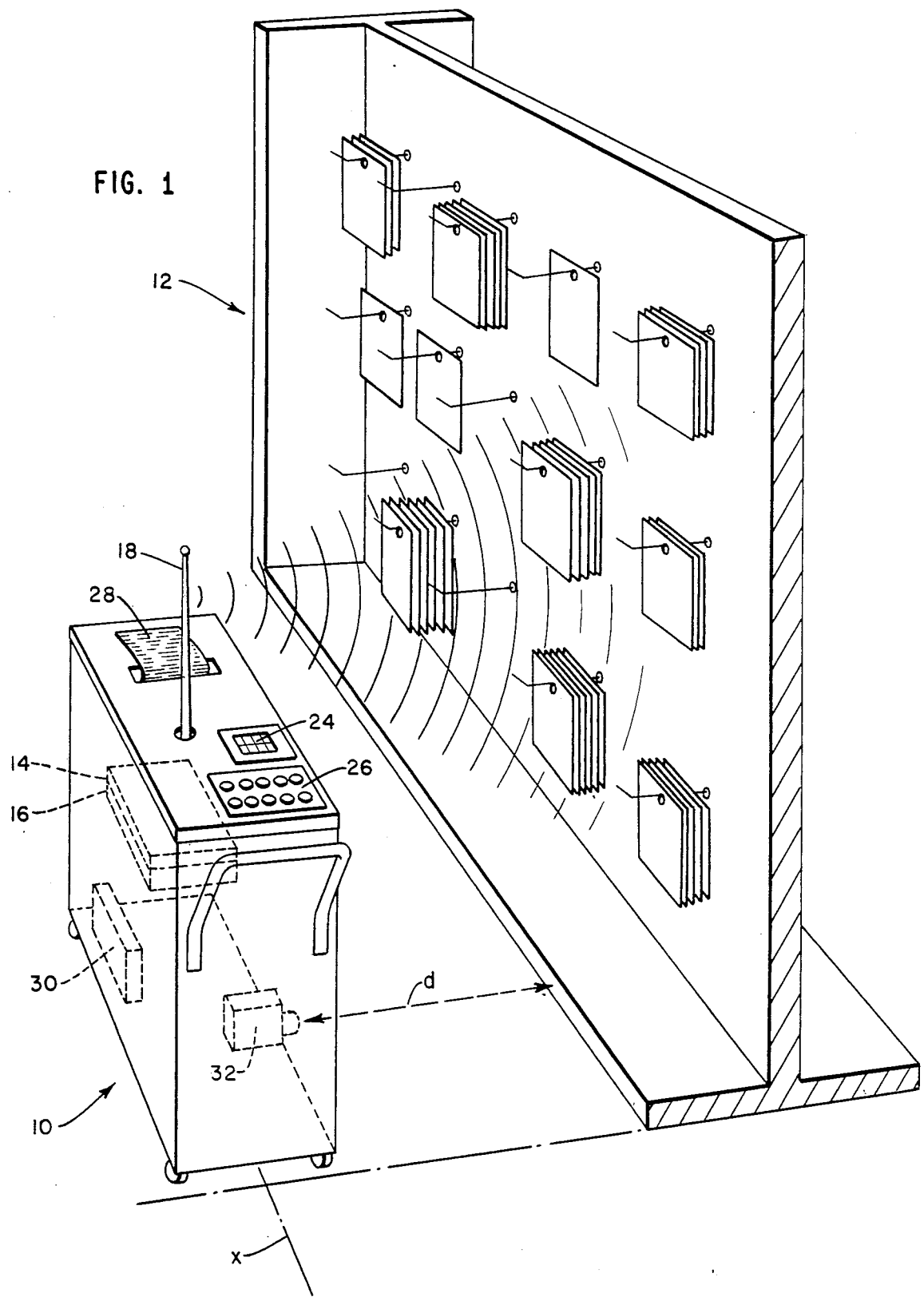
FIG. 1 is a pictorial perspective view of the transceiver cart in a shopping aisle according to the invention.
Figure 2:
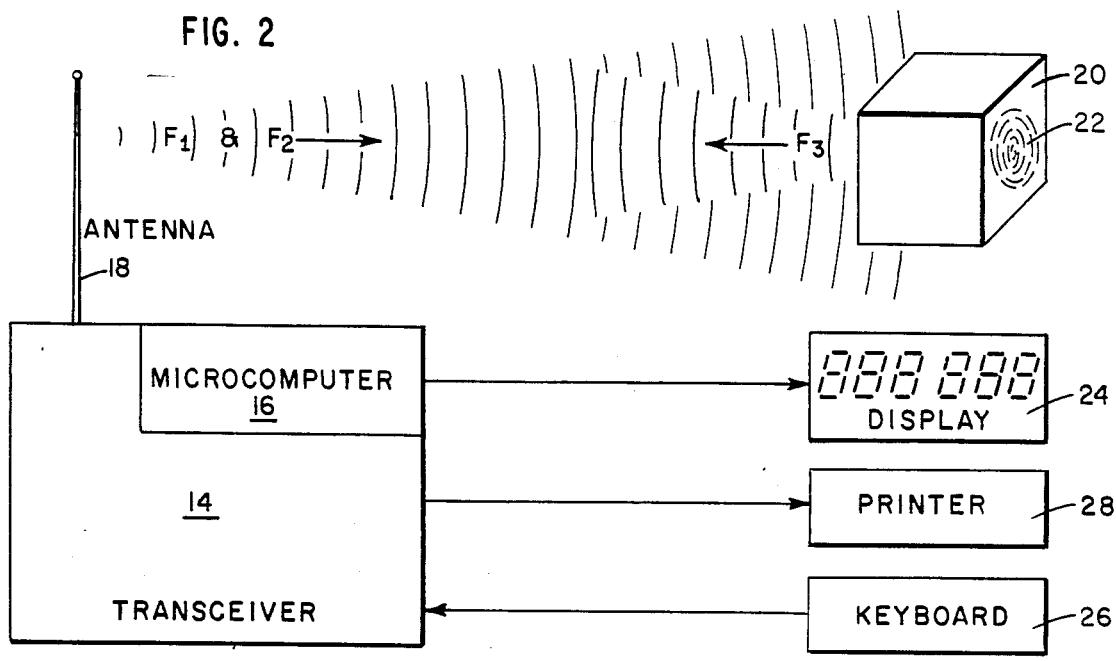
FIG. 2 is a schematic representation of the transceiver interrogating a tagged product according to the invention.

As shown in FIG. 1, the interrogation system is mounted on a cart 10 which can be wheeled down an aisle in a retail store alongside a pegboard type display rack 12 bearing products which are to be inventoried. As shown in FIG. 2, the transceiver 14 under the control of the microcomputer 16 transmits a pair of frequencies $F_1$ and $F_2$ corresponding to a given SKU. A packaged product 20 of the SKU being interrogated is equipped with a specially designed printed circuit tag 22 which is resonant at the transmitted frequencies and simultaneously reradiates a third frequency signal $F_3$ which is picked up by the antenna 18 and received in the transceiver 14. The strength of the return at $F_3$ is measured and stored as the cart 10 rolls along the display rack 12 and the stored data is processed by an on-board programmed microcomputer 16 to produce a numerical display 24 of the total number of units in the given SKU corresponding to the frequency set $F_1$, $F_2$, and $F_3$. As the cart is wheeled down the aisle, the microprocessor controls the transmitter in the transceiver 14 to sweep stepwise through all of the pertinent SKU's entered via the keyboard 26 (FIG. 1). The resulting numerical quantities of products in each designated SKU are printed out on command at the end of the aisle or when the shelf inventory for the entire store is completed. As an aid in processing the return signal strength, the cart 10 is equipped with an odometer 30 which keeps track of displacement in the X direction along the length of the peg rack and a sonar ranging device 32 for keeping track of the distance of the cart 10 from the peg rack 12.

Figure 3:
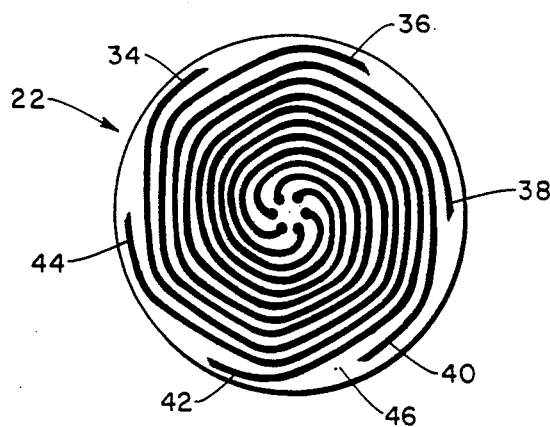
FIG. 3 is a plan view of a printed circuit tag according to the invention.

As shown in FIG. 3, each product tag 22 comprises six coaxial interleaved conductive arms 34, 36, 38, 40, 42 and 44 mounted on a flexible nonconductive substrate 46. The arms themselves are made of etched copper foil in the manner of a printed circuit. The inner ends of the arms are connected to an array of six spaced terminals, while the outer ends are trimmed to length. The interwoven spiral arms are paired in such a manner that there is a pair corresponding to $F_1$, another pair corresponding to $F_2$, and a third pair corresponding to $F_3$. Each pair is tuned to the corresponding frequency by trimming the length of the corresponding arms. The respective pairs are nonlinearly mutually capacitively and inductively coupled so that upon excitation at frequencies $F_1$ and $F_2$, the tag emits a third frequency $F_3$ which is the sum of the frequencies of $F_1$ and $F_2$. By assigning uniquely cut tags to each SKU, all of the products on the shelf can be differentiated by their frequency response. The nonlinear capacitance effect is equivalent to a mild piezoelectric effect and is designed to be essentially nondirectional so that the response will be independent of the products attitude or orientation on the shelf. The tag is intended in the preferred embodiment to be about the size of a fingernail, approximately $\frac{1}{4}$ to $\frac{3}{8}$ of an inch in diameter and can be concealed in the packaging itself since it is unnecessary to optically scan the tag. Moreover, the tag can be bent or wrapped, e.g., around a lipstick, without noticeable effect on the function.

Figure 4:
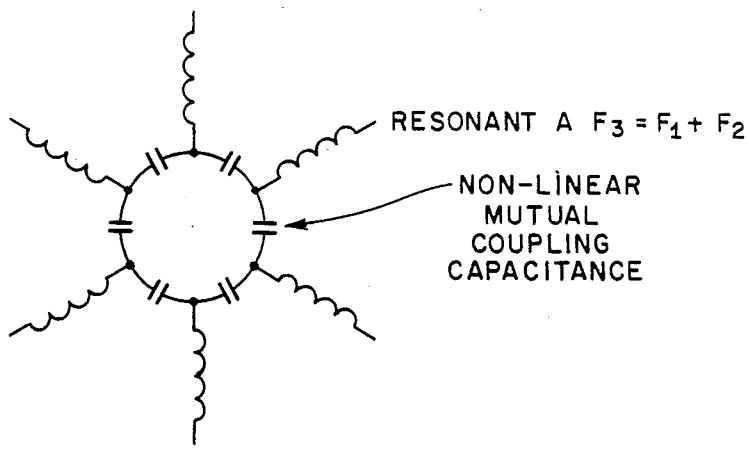
FIG. 4 is an electrical schematic drawing representing an idealized equivalent circuit for the tag of FIG. 3.

The equivalent circuit shown in FIG. 4 illustrates the nonlinear mutual coupling capacitors between the spiral arms. The needed capacitance provided through the proximity of the antenna elements in the tag can be enhanced by the use of a solid sheet conductor on the other side of the nonconductive substrate 46. The coaxial resonator tag system is a completely passive transponder in the sense that the only energy which it consumes is that which it receives from the transmitter on the cart.

The transceiver 14 consists of three major portions: the transmitter, receiver and the microcomputer 16 which controls the system. In the transmitter, two precise frequencies are generated under computer command by phase-locked frequency synthesis. The two frequencies are radiated to the SKU-specific tags which act as radio frequency resonators and transponders. A particular tag will reradiate a frequency equal to the sum of the transmitted frequencies if the transmitted frequencies are the particular ones that the tag is tuned to. If the tag is not tuned to the transmitted frequencies, it will not return a signal. The receiver section is instructed by the microcomputer to "listen" for the sum frequency corresponding to the two transmitted frequencies. The receiver is tuned by means of another phase-locked synthesizer. The computer sequences the synthesizers through each selected set of frequencies.

Figure 5:
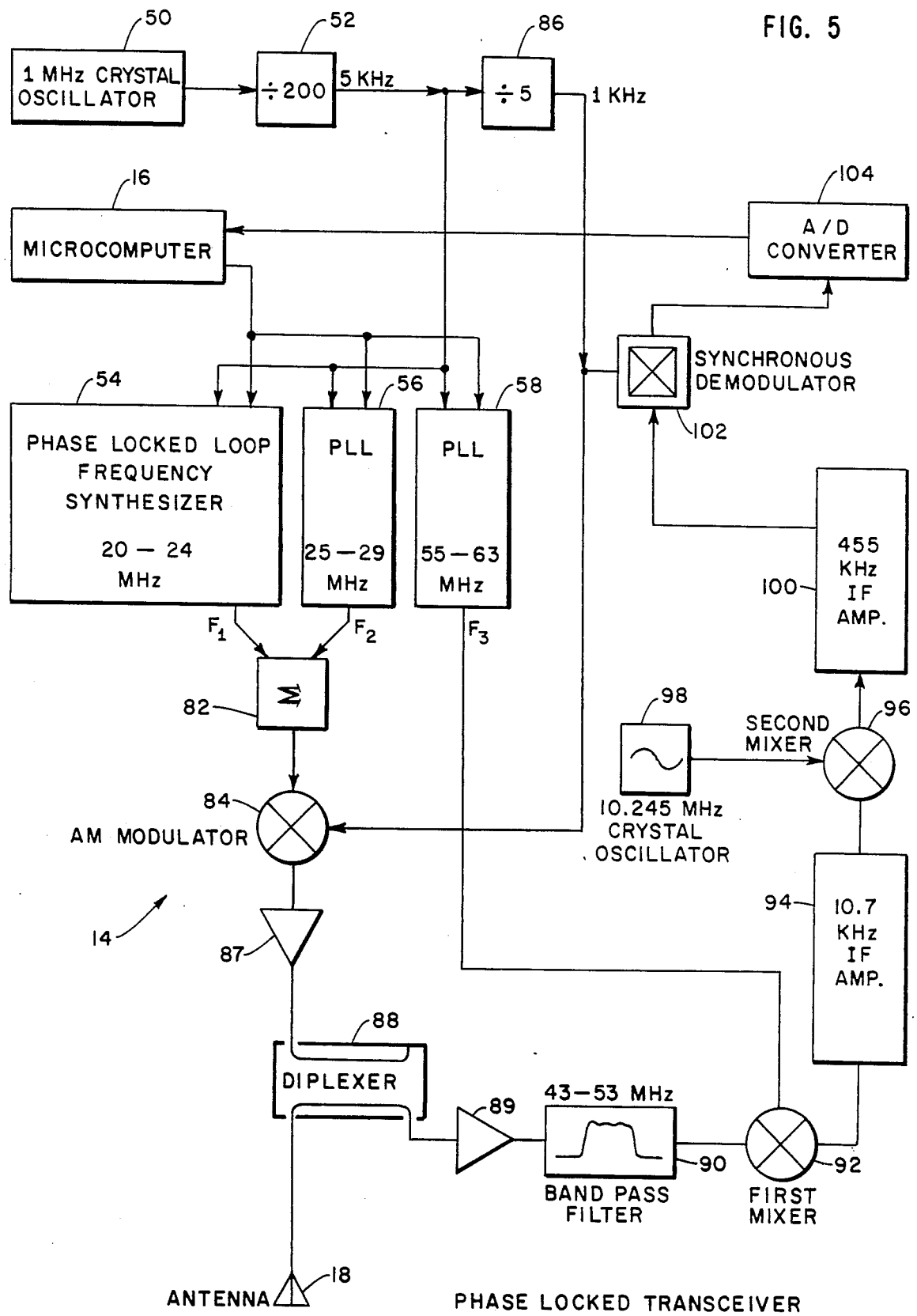
FIG. 5 is a block diagram of the transceiver according to the invention.
Figure 6:
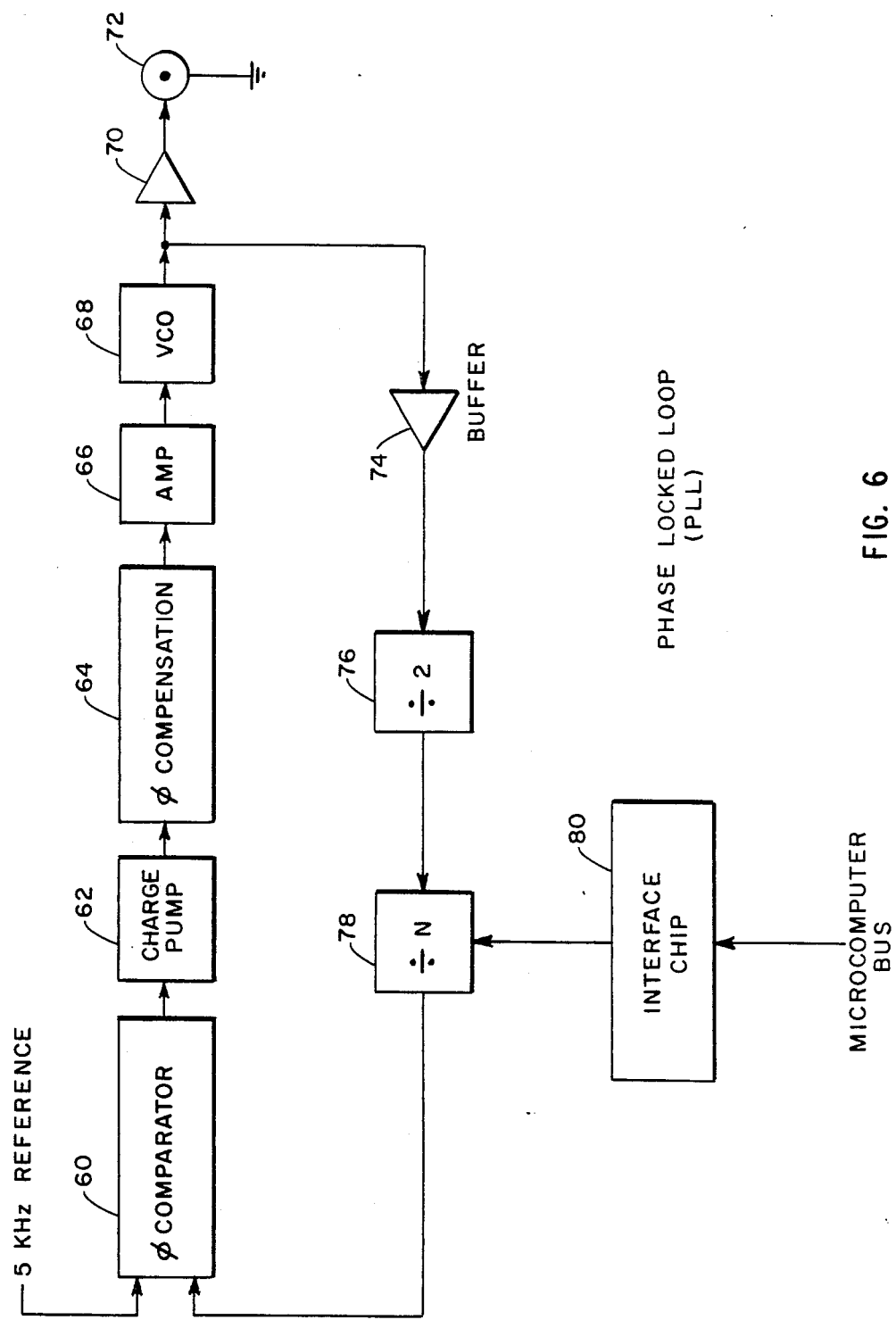
FIG. 6 is a block diagram of one of the phase-locked loops of the transceiver of FIG. 5.

In the transceiver circuit of FIG. 5, the 1 MHz output of a crystal oscillator 50 is divided by 200 in counter circuit 52. The resulting 5 KHz reference signal is fed in parallel to three phase-locked loops 54, 56 and 58 corresponding to frequencies $F_1$, $F_2$ and $F_3$, respectively. Each phase-locked loop is implemented as shown in FIG. 6. The 5 KHz reference signal forms one input to a phase comparator 60 whose output is fed via a charge pump 62, phase compensation circuit 64 and amplifier 66 to the control input of a voltage controlled oscillator 68. The output of the oscillator 68 is a continuous wave signal which is fed via the power amplifier 70 to coaxial output cable 72. The output of the voltage controlled oscillator 68 also forms the input to a feedback loop comprising buffer amplifier 74, a frequency halving circuit 76 and a divide by N circuit 78. The divided down output of the phase-locked loop circuit forms the other input to the phase comparator 60. The value of N is determined by the microcomputer via a suitable interface chip 80 in order to select the specific value for frequency $F_1$, $F_2$ or $F_3$ associated with each SKU.

As shown in FIG. 5, the output of two of the phase-locked loops are in nonoverlapping respective ranges 20–24 MHz and 25–29 MHz. These outputs are combined in a summation circuit 82 and amplitude modulated in modulator 84 by a 1,000 Hz square wave derived from the 5 KHz reference signal via divider circuit 86. The amplitude modulated sum of signals $F_1$ and $F_2$ is fed via RF amplifier 87 and diplexer circuit 88 to antenna 18. The other side of the diplexer 88 feeds the received signal via another RF amplifier 89 through a 43–53 MHz bandpass filter 90 to a first mixer 92 which sums the received signal minus higher and lower frequency noise with the unmodulated $F_3$ output of phase-lock loop circuit 58 which serves as a local oscillator. Mixer 92 produces a 10.7 MHz output signal which is amplified in IF amplifier 94 and passed to a second mixer 96 which mixes the first IF output with the output of a 10.245 MHz crystal oscillator 98. The output of mixer 96 is fed via a 455 KHz IF amplifier 100 to a synchronous demodulator 102 which demodulates the received signal with the benefit of the 1,000 Hz modulation signal. The demodulated received signal is fed via analog-to-digital converter 104 (preferably 12-bit) back to the microcomputer 16 for processing.

Figure 7:
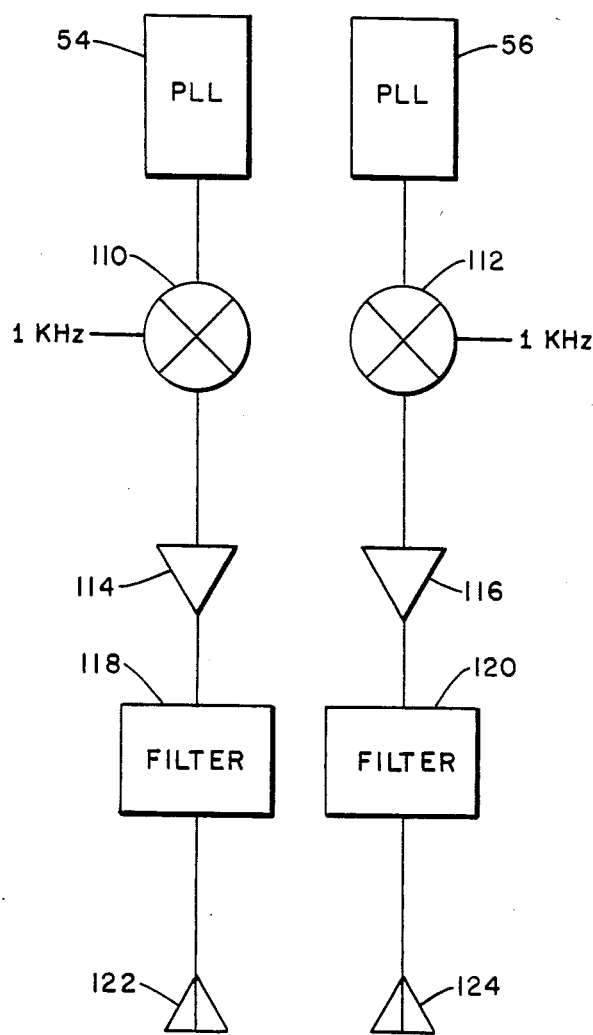
FIG. 7 is a block diagram of an alternate embodiment of a portion of the transmitter circuitry.

A variation on the transmit circuit of FIG. 5 is shown in FIG. 7 in which the frequencies $F_1$ and $F_2$ are kept entirely separate. In experiments with a circuit constructed according to FIG. 5, it was discovered that third order intermodulation distortion of the output amplifier was high enough that simple filtering left the harmonic sum of $F_1$ and $F_2$ at a higher strength than the received reradiated signal from the tags. This problem is addressed in FIG. 7 by providing separate modulators 110 and 112, RF amplifiers 114 and 116, filters 118 and 120 and separate transmit antennas 122 and 124. Filters 118 and 120 should be carefully designed to eliminate mixing of the other frequency at the output of either amplifier 114 or 116.

Figure 8:
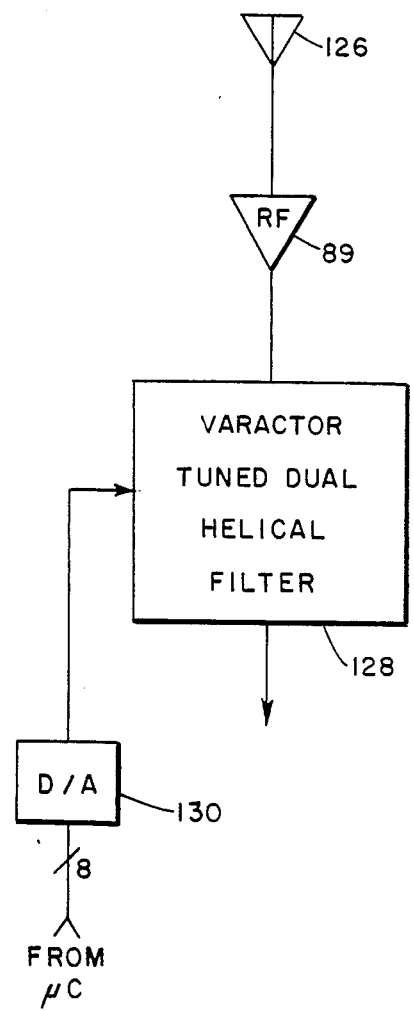
FIG. 8 is a block diagram of an alternate embodiment of a portion of the receiver circuitry.

An alternate design for a portion of the receiver is shown in FIG. 8. A separate receive antenna 126 is used and after RF amplifier 89, the bandpass filter 90 is replaced by an varactor-tuned dual helical filter 128 which is controlled by the microcomputer via a digital-to-analog converter 130. The filter 128 can be approximately tuned to the desired received frequency to exclude unwanted interference.

Antennas used in the designs of FIGS. 5, 7 and 8 are center-loaded, short, vertical dipole whip antennas. Common practice is to make such antennas one-quarter wave length in length. However, at 30 MHz, this results in an impractically long antenna. Thus, the efficiency of the antenna is sacrificed to reduce its length. At higher frequencies more suitable for use with the tag design of FIG. 3, a more efficient antenna design will become practical. The vertical whip-type antenna, which exhibits linear polarization may be effectively replaced by a circular-polarized design to minimize variations in signal strength due to tag orientation.

Figure 9:
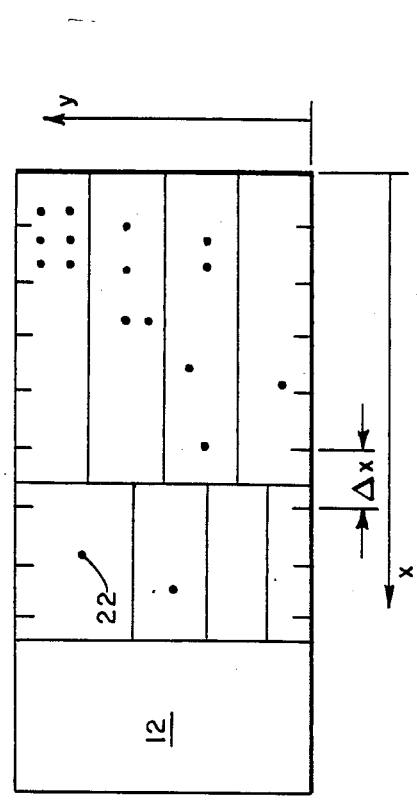
FIG. 9 is a schematic representation of a retail pegboard rack from the front displaying products of a specific SKU as dots.

With reference to FIG. 9, assume that the pegboard rack has a number of products of the same SKU distributed as indicated by the dots. Displacement of the interrogation cart 10 (FIG. 1) in the X direction is indicated by the arrow marked X.

Figure 12:
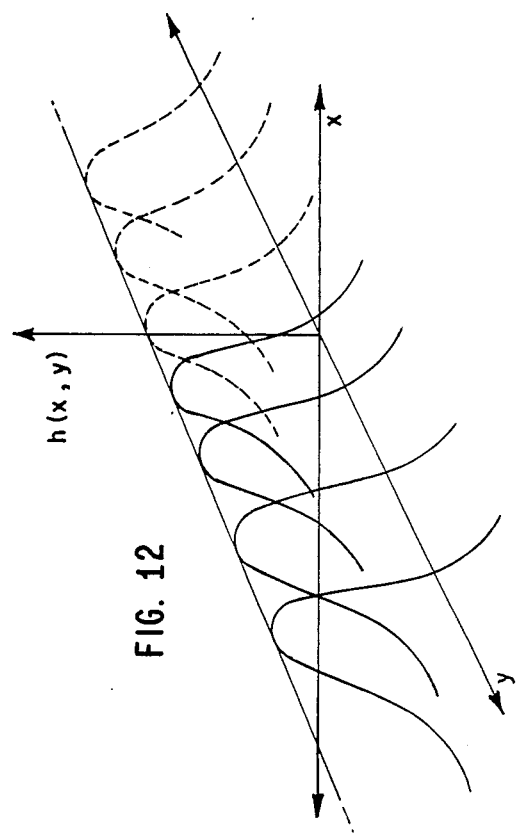
FIG. 12 is a three-dimensional graph of the radiated signal pattern as a function of displacement along the peg rack and the product's elevation above the floor.
Figure 10:
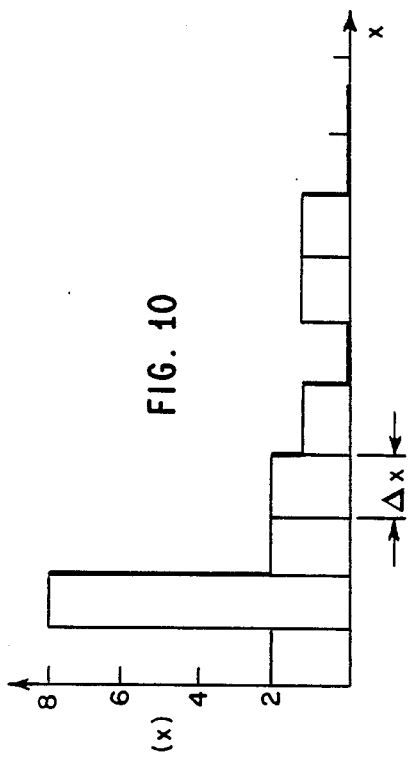
FIG. 10 is a histogram representing the quantity of products in each incremental unit of distance along the peg rack.
Figure 11:
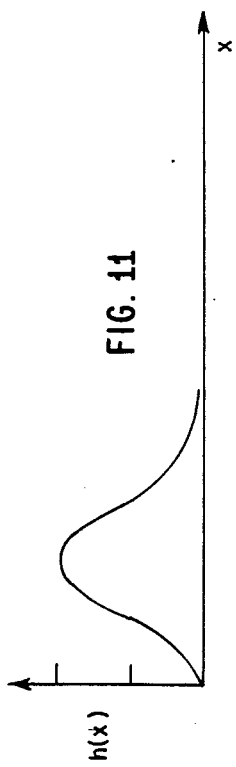
FIG. 11 is a graph showing the radiated signal pattern as a function of displacement along the peg rack.

The histogram in FIG. 10 represents the exact quantity of products in any incremental slot delta X. This function is designated $V(x)$ where V represents the specific number of products at any given location along the x axis. A single radiating tag, for example, tag 22 in FIG. 9 produces a radiated field with an intensity which exhibits an exponential distribution over the x axis as shown in the graph of FIG. 11, $H(x)$ representing the signal strength. Signal strength is also, of course, a function of displacement in the vertical direction from the radiating tag 22, however, as shown in the graph of FIG. 12, the slight variation can be safely ignored in most instances.

Figure 13:
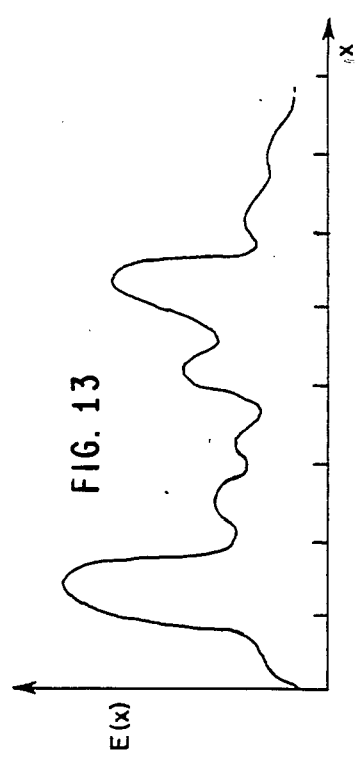
FIG. 13 is a graph of the received energy from plural tags as a function of displacement along the peg rack.

If the cart 10 were rolled along direction x from right to left in FIG. 9, transmitting at the combination of frequencies $F_1$ and $F_2$ uniquely assigned to this particular SKU identified by the dots, the strength of the received signal would be distributed over the x axis as shown in the graph of $E(x)$ in FIG. 13.

Due to the overlap produced by the finite width of the radiated signals, the waveform in FIG. 13 does not duplicate the histogram of FIG. 10. Since the desired quantity, the inventory, consists of a sum and does not require reconstructing the exact shape of the waveform as received, the microcomputer 16 is programmed to perform a numerical integration of the area under the curve of the graph of FIG. 13.

Assume that $E(\text{delta } x_i)$ is proportional to m, where m is the total number of products in the ith delta x slot. E, a function of x, is generally the convolution of the distribution function $V(x)$ convolved with the radiated signal pattern function $H(x)$ as given by the Equation 1.

$$E(x) = V(x) * H(x) \qquad (1)$$

Applying Fourier transforms to equation 1 results in Equation 2, $$E(\nu) = V(\nu)H(\nu) \qquad (2)$$

which, when solved for the actual distribution function as a function of the frequency $\nu$, results in the following equation (Equation 3).

$$V(\nu) = \frac{\epsilon(\nu)}{H(\nu)} \qquad (3)$$

Thus, the actual distribution function is a ratio between the reconstructed pattern as measured and the transformed radiated signal pattern. The total number of products on the shelf T is (Equation 4).

$$T = \int V(x)dx \qquad (4)$$

Equation 4 can also be represented as the Fourier transform of the distribution function evaluated where frequency equals 0.

$$T = V(\nu)|_{\nu=0} \qquad (5)$$

Substituting the ratio of Equation 3 and replacing the Fourier transformed ratios with plain integrals of the untransformed distribution functions results in Equation 6.

$$V(\nu)\bigg|_{\nu=0} = \frac{\epsilon(\nu)|_{\nu=0}}{H(\nu)|_{\nu=0}} \qquad (6)$$

Since a complete reconstruction of the distribution pattern is unnecessary as only the total number of products is desired, the Fourier transforms may be replaced by a simple running integral of the observed waveforms.

$$T = \frac{\int E(x)dx}{\int h(x)dx} \qquad (7)$$

Thus, the ratio shown in Equation 7 is sufficient to produce the total number of products on the shelf as measured during a walk-down of the shelf. Hence, a simple numerical integration can be performed on the received data by the microcomputer 16 contained in the transceiver unit to produce the readout shown in FIG. 2 of the quantity of a particular SKU on the shelf.

The numerator of Equation 7 is a running numerical integration; the denominator is a measured system constant related to the signal pattern radiated by each tag. The running integration is best performed by a separate mathematical processor such as the Intel 8087 used as a coprocessor in conjunction with a main controller microprocessor such as the Intel 8086.

Since each product responds to a unique combination of frequencies $F_1$ and $F_2$, the microprocessor must be fast enough to sweep through all possible combinations so that for a given minimum interproduct spacing delta x, each such delta x is sampled at least once for each SKU specific frequency set. The response at $F_3$ is processed by numerical integration providing a running sum for each product on the rack.

The advantages of the above described automatic shelf inventory system are be readily apparent. Radio frequency interrogation of comingled tagged products on a rack eliminates hand counting, visual inspection of thousands of SKU's in a given retail store. The ability to establish precise control over the shelf inventory assures optimized inventory flow from the stockroom to the checkout counter. The retailer's profits are increased by eliminating inadvertent stock-out conditions. Moreover, the system is so fast and potentially inexpensive that it can be used on a daily basis to track shelf inventory trends and make adjustments to inventory.

The unique tag of the present invention can be mass-produced by printed circuit techniques and can be made small enough to be invisibly incorporated in the packaging of even the smallest shelf items. The novel mobile interrogator enables an unskilled operator to completely inventory the shelf stock in a retail store without counting a single SKU. Thus, human error is eliminated. The appropriate SKU numbers can be entered for a given aisle by preloading the computer memory with the SKU's which are normally stocked on a particular rack. Thus, the operator would only have to enter the rack number. Alternatively, given sufficient computer speed and settling time for the transceiver, all of the store's SKU's could be interrogated on each walkdown of each rack. Because the frequencies are all derived from a single master crystal oscillator, any drift would be experienced on all three frequencies simultaneously and the effect will be minimized.

The foregoing description of the presently preferred embodiments is intended to be illustrative and not restrictive. Many variations and modifications of the overall system or individual components are possible, still employing the underlying principle of the invention, without departing from the scope of the invention as indicated by the appended claims and equivalents thereto.

What is claimed is:

1. A method of identifying and determining the number of comingled stationary items by group distributed over an interrogation area, comprising the steps of
    assigning a unique transmit/receive frequency to each group of corresponding items,
    from a remote location, transmitting to said interrogation area at at least one group-specific frequency,
    reradiating a different unique specific frequency from each item in the interrogation area belonging to the specific group,
    receiving the reradiated group-specific frequency at said remote location,
    converting the received signal strength for said specific group to measured data related to the quantity of items in the specific group in the interrogation area.

2. The method of claim 1, further comprising the steps of sweeping stepwise through a plurality of unique group-specific transmit/receive frequencies by tuning a transmitter/receiver at said remote location to successive frequencies while recording the received signal strength at each frequency set,
    whereby the received signal strength for each group is successively sampled and measured.

3. The method of claim 1, further comprising the steps of
    repeatedly incrementally displacing said remote location for transmitting and receiving in the direction of distribution of said groups of items over the interrogation area while repeating the transmitting and receiving at said group-specific frequency set, and
    measuring the signal strength at each incremental relocation and combining the signal strength at successive locations to produce an indication of the quantity of items in said specific group in the interrogation area.

4. The method of claim 2, further comprising the steps of
    repeatedly incrementally displacing the remote location for transmitting and receiving in the direction of distribution of groups of items along said interrogation area,
    at each relocation, repeating the successive sweeping of said group-specific frequency sets,
    at each relocation, measuring the group-specific signal strength, and
    combining the measured signal strength for each corresponding group at each incremental location to produce an indication of the remaining quantity of items in each group in the interrogation area.

5. The method of claim 1, wherein the transmitting step includes simultaneously transmitting a unique pair of frequencies assigned to a given group,
    said items in the given group responding uniquely to said pair of transmitted frequencies by producing and radiating a third frequency algebraically related to said unique pair of frequencies.

6. The method of claim 1, wherein the step of transmitting further includes amplitude modulating the transmitted frequency to assist in recovery of the radiated signal.

7. Apparatus for identifying and determining the numbers of items in comingled groups of items distributed along an interrogation area, comprising
    a unit movable relative to said items having antenna means for transmitting and receiving radio frequency signals,
    transmitter means for transmitting at at least one frequency assigned to a given group of items toward said interrogation area via said antenna means,
    tuned receiver means for receiving at a different frequency assigned to said group of items via said antenna means,
    identical tag means affixed to each item of said specific group, having passive miniaturized electronic circuit means for responding to said transmit frequency and reradiating simultaneously at said receive frequency,
    means for sampling the signal strength received via said receiver means due to the presence of items in said specific group at a succession of locations along said interrogation area to produce an indication of the quantity of items in said specific group in the interrogation area,
    whereby without manipulation, the quantity of items in a given group among other groups of items can be remotely ascertained.

8. The apparatus of claim 7, wherein said transmitter means includes means for generating simultaneously two different frequencies specified for a given group of items.

9. The apparatus of claim 7, further comprising means for generating a succession of pairs of frequencies uniquely assigned to a corresponding plurality of groups of items, said tags for a specific group of items having means for responding exclusively to the reception of said unique frequency pair and further having means for reradiating a third frequency algebraically related to said unique pair of transmitted frequencies.

10. The apparatus of claim 9, wherein said means for generating frequency pairs includes a master oscillator producing a fixed frequency output and a pair of phase-locked loop frequency synthesizing means.

11. The apparatus of claim 10, further comprising microcomputer means for producing a succession of outputs representing the frequency pairs for a plurality of groups, said phase-locked loop means having means responsive to the respective frequency pair outputs of said microcomputer for synthesizing the pair of indicated frequencies.

12. The apparatus of claim 11, wherein said receiving means includes means for generating a local oscillator frequency related to the specific frequency reradiated by tags of a specific group.

13. The apparatus of claim 11, wherein said receiving means includes means for generating a local oscillator frequency related to the frequency radiated by tags of a specific group of items including a third phase-locked loop frequency synthesizing means connected to receive the output of said master oscillator, said microcomputer means producing along with said transmit frequency pair, the corresponding receive frequency for each successive group, said third phase-locked loop means being responsive to the receive frequency output of said microcomputer means for synthesizing a local oscillator frequency related to the group-specific receive frequency.

14. The apparatus of claim 10, wherein said transmitting means further includes means for amplitude modulating the output of said first two phase-locked loop means.

15. The apparatus of claim 14, wherein said receiving means further includes means for synchronously detecting the received signal by mixing it with the signal employed for amplitude modulation of the transmitted pair of frequencies.

16. The apparatus of claim 8, wherein said tag means includes three electronic circuit means resonant respectively at the pair of transmitted frequencies and the receive frequency radiated by said tag.

17. The apparatus of claim 16, wherein said tag means further includes means for nonlinearly mutually capacitively and inductively coupling said three resonant circuit means.

18. The apparatus of claim 17, wherein said tag means includes three pairs of coaxial, coplanar, interleaved spiral conductive arms, the arms of each respective pair being cut to a length corresponding to the respective one of said SKU-specific frequencies.

* * * * *